US012356522B2

(12) United States Patent
Zou et al.

(10) Patent No.: US 12,356,522 B2
(45) Date of Patent: Jul. 8, 2025

(54) DRIVER FOR LED DEVICE, LED SYSTEM, AND ADAPTATION METHOD FOR LED DEVICE

(71) Applicant: SAVANT TECHNOLOGIES LLC, East Cleveland, OH (US)

(72) Inventors: Qiang Zou, ShaanXi (CN); Zhichao Liu, Shanghai (CN); Qi Yan, ShaanXi (CN)

(73) Assignee: SAVANT TECHNOLOGIES LLC, East Cleveland, OH (US)

( * ) Notice: Subject to any disclaimer, the term of this patent is extended or adjusted under 35 U.S.C. 154(b) by 0 days.

(21) Appl. No.: 18/742,042

(22) Filed: Jun. 13, 2024

(65) Prior Publication Data

US 2024/0334568 A1 Oct. 3, 2024

Related U.S. Application Data

(63) Continuation of application No. 17/761,258, filed as application No. PCT/CN2019/106175 on Sep. 17, 2019, now Pat. No. 12,041,701.

(51) Int. Cl.
*H05B 45/37* (2020.01)
*H05B 45/305* (2020.01)
*H05B 45/345* (2020.01)

(52) U.S. Cl.
CPC .......... *H05B 45/37* (2020.01); *H05B 45/305* (2020.01); *H05B 45/345* (2020.01)

(58) Field of Classification Search
None
See application file for complete search history.

(56) References Cited

U.S. PATENT DOCUMENTS 7,380,961 B2 6/2008 Moriyama et al.
9,918,361 B1 3/2018 Espino et al.
(Continued)

FOREIGN PATENT DOCUMENTS

CN 104219835 A 12/2014
CN 105704867 A 6/2016
(Continued)

OTHER PUBLICATIONS

First Chinese Office Action dated Jun. 7, 2021 which was issued in connection with CN201810575711.X.
(Continued)

*Primary Examiner* — Anh Q Tran
(74) *Attorney, Agent, or Firm* — Buckley, Maschoff & Talwalkar LLC

(57) ABSTRACT

A driver and method for operating a driver circuit for a light-emitting diode (LED) device. In some embodiments, the driver circuit includes a rectifier operatively coupled to a ballast, a current regulator operatively coupled to the rectifier and to the LED device, and a detecting module operatively coupled to the LED device and to the current regulator. During a startup stage, the rectifier of the driver circuit rectifies direct current received from the ballast and provides the rectified current to the current regulator. The detecting module then detects a current through the LED device provided by the current regulator during the startup stage, wherein a value of the current through the LED device is a detecting indictor. The detecting module next provides the value of the current through the LED device to the current regulator which determines that it is outside a preset value range, converts the rectified current from the rectifier into a driving current having a value within the preset value range, and outputs the driving current to the LED device.

14 Claims, 6 Drawing Sheets

(56) References Cited

U.S. PATENT DOCUMENTS

| | | | | |
|---|---|---|---|---|
| 2014/0035463 | A1 | 2/2014 | Miyamichi | |
| 2016/0363308 | A1* | 12/2016 | Shum | F21V 23/006 |
| 2017/0094746 | A1 | 3/2017 | Xiong et al. | |
| 2017/0257928 | A1 | 9/2017 | Hsia | |
| 2020/0217495 | A1* | 7/2020 | Shum | H05B 45/395 |

FOREIGN PATENT DOCUMENTS

| | | | | |
|---|---|---|---|---|
| CN | 105848375 | A | 8/2016 | |
| CN | 106804080 | A | 6/2017 | |
| CN | 107682953 | A | 2/2018 | |
| CN | 108347805 | A | 7/2018 | |
| CN | 108990199 | A | 12/2018 | |
| CN | 109246891 | A | 1/2019 | |
| CN | 106804080 | B | 11/2019 | |
| CN | 110572896 | A | 12/2019 | |
| JP | 2017199644 | A | 11/2017 | |
| WO | WO-2016029675 | A1 * | 3/2016 | H05B 33/0815 |

OTHER PUBLICATIONS

International Search Report and Written Opinion dated Jun. 15, 2020 which was issued in connection with PCT/CN2019/106175.

892 Form dated Oct. 23, 2023 which was received in connection with U.S. Appl. No. 17/761,258.

Notice of Allowance dated Mar. 13, 2024 which was received in connection with U.S. Appl. No. 17/761,258.

* cited by examiner

DRIVER FOR LED DEVICE, LED SYSTEM, AND ADAPTATION METHOD FOR LED DEVICE

CROSS-REFERENCE TO RELATED APPLICATION

This application claims the benefit of copending U.S. patent application Ser. No. 17/761,258 filed on Mar. 17, 2022, the contents of which are hereby incorporated by reference for all purposes.

BACKGROUND

Embodiments of the present disclosure relate generally to drivers for LED devices, LED systems and adapting methods for LED devices.

In recent years, luminaires retrofit market is growing significantly. Retrofit LED lamps can be used to replace the original fluorescent lamps to increase luminous efficiency and improve luminous effect.

However, there is adaptation issue between the LED lamp and the ballast of the original fluorescent lamp. Because output current values of different types of ballasts vary greatly, in the prior art, it is usually necessary to design different LED loads for different types of ballasts, which greatly increases costs for design and production.

Therefore, it is desirable to provide new drivers for LED devices, LED systems and adapting methods for LED devices to solve the above-mentioned problem.

BRIEF DESCRIPTION

A driver for a light-emitting diode (LED) device is configured to be coupled between a ballast and the LED device and adapt the LED device to the ballast. The driver comprises a rectifier, a current regulator and a detecting module. The rectifier is coupled to the ballast and configured to convert an alternating current from the ballast into a direct current. The current regulator is coupled between the rectifier and the LED device, and configured to receive the direct current from the rectifier and output a driving current to the LED device. The detecting module is configured to detect a signal indicating an output characteristic of the ballast, during a startup stage of the LED device. The current regulator is configured to convert the direct current from the rectifier into the driving current with a value equal to or less than a preset current threshold when the signal meets a preset condition, and the preset current threshold is less than a maximum current the LED device is able to carry without damage.

A light-emitting diode (LED) system comprises an LED device and a driver for the LED device. The driver is configured to be coupled between a ballast and the LED device and adapt the LED device to the ballast. The driver comprises a rectifier, a current regulator and a detecting module. The rectifier is coupled to the ballast and configured to convert an alternating current from the ballast into a direct current. The current regulator is coupled between the rectifier and the LED device, and configured to receive the direct current from the rectifier and output a driving current to the LED device. The detecting module is configured to detect a signal indicating an output characteristic of the ballast, during a startup stage of the LED device. The current regulator is configured to convert the direct current into the driving current with a value equal to or less than a preset current threshold if the signal meets a preset condition, and the preset current threshold is less than a maximum current the LED device is able to carry without damage.

A method for adapting an LED device to a ballast, comprises converting an alternating current from the ballast into a direct current by a rectifier; receiving the direct current from the rectifier and outputting a driving current to the LED device by a current regulator; detecting a signal indicating an output characteristic of the ballast during a startup stage of the LED device; and converting the direct current from the rectifier into the driving current with a value equal to or less than a preset current threshold if the signal meets a preset condition, wherein the preset current threshold is less than a maximum current the LED device is able to carry without damage.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort would nevertheless be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," "third," "fourth," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having," and variations thereof herein are meant to encompass the items listed thereafter and equivalents thereof as well as additional items.

Embodiments of the present disclosure relate to an LED driver and an LED system comprising the LED driver. The LED driver is able to adapt an LED device to various types of ballasts, so that the LED system comprising the LED driver can be applied to many different types of ballasts.

Figure 1:
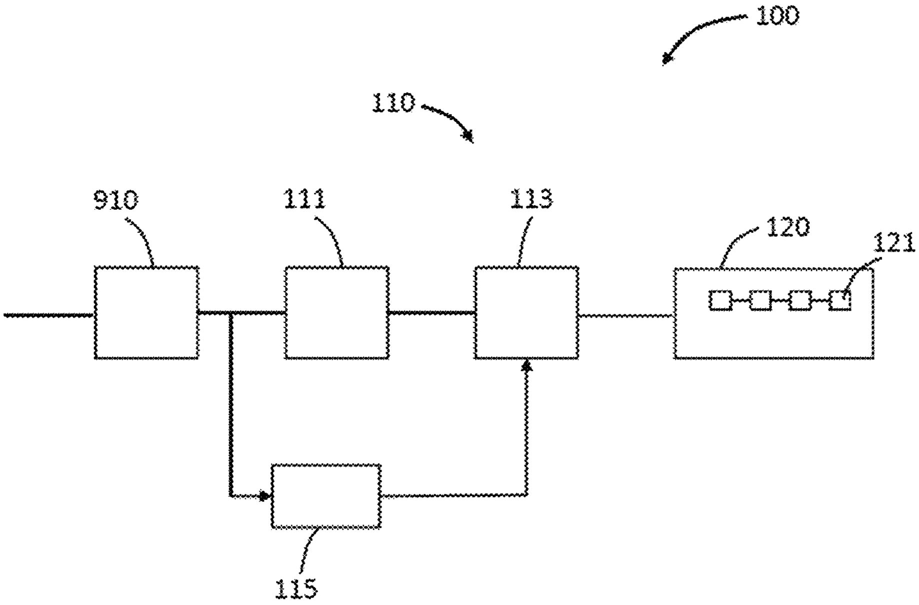
FIG. 1 is a sketch view of an LED system in accordance with an exemplary embodiment of the present disclosure.

FIG. 1 is a sketch view of an LED system 100 in accordance with an exemplary embodiment of the present disclosure. Referring to FIG. 1, the LED system 100 comprises an LED device 120 and a driver 110 for the LED device. The driver 110 is configured to be coupled between a ballast 910 and the LED device 120 and adapt the LED device 120 to the ballast 910, i.e., when the LED system 100 comprising the driver 110 can work normally when being coupled with the ballast 910.

The driver comprises a rectifier 111, a current regulator 113 and a detecting module 115. The rectifier 111 is configured to be coupled to the ballast 910 and configured to convert an alternating current from the ballast 910 into a direct current.

The current regulator 113 is coupled between the rectifier 111 and the LED device 120, and configured to receive the direct current from the rectifier 111 and output a driving current to the LED device 120.

The detecting module 115 is configured to detect a signal indicating an output characteristic of the ballast 910 during a startup stage of the LED device 120; wherein the startup stage refers to a time period from energization of the ballast 910 to lighting up of the LED device. Usually, the startup stage starts from a moment of the energization of the ballast 910 and lasts for about 0.1 to 2 seconds after the moment. Different types of the ballasts have different output characteristics, so after detecting the signal indicating the output characteristic of the ballast 910, the output current can be processed according to its output characteristics, in such a manner that the driving current outputted to the LED device can meet working requirements of the LED device.

When the signal meets a preset condition, i.e.: when the output characteristic of the ballast indicated by the signal can not be adapted to LED device, the current regulator 113 is configured to convert the direct current into the driving current with a value equal to or less than a preset current threshold, and the preset current threshold is less than a maximum current the LED device is able to carry without damage, which can ensure the LED device 120 works normally under the driving of the driving current. For example, the preset current threshold is set as 40%-80% of the maximum current.

When the signal doesn't meet the preset condition, i.e.: when the output characteristic of the ballast indicated by the signal can be adapted to LED device, the current regulator 113 is configured to output the direct current from the rectifier to the LED device 120 as the driving current. In this case, the direct current outputted by the rectifier 111 is less than the preset current threshold, so the current regulator 113 can be bypassed to transport the direct current directly to the LED device 120 and enable the LED device to work normally.

Referring to FIG. 1, in some embodiments, the detecting module 115 is coupled between an output terminal of the ballast 910 and the current regulator 113, and configured to detect the alternating current or an alternating voltage outputted by the ballast during the startup stage of the LED device 120, and output the detected signal to the current regulator 113.

In some embodiment, a preset value range is set for the above detecting indicator, i.e.: the alternating current or the alternating voltage outputted by the ballast. When the alternating current or the alternating voltage outputted by the ballast is in the corresponding preset value range, the direct current outputted by the rectifier 111 can meet the working requirements of the LED device, i.e.: the direct current outputted by the rectifier 111 is equal to or less than the preset current threshold. Therefore, it is not necessary to process the direct current, and the current regulator 113 outputs the direct current from the rectifier 111 to the LED device as the driving current.

When the alternating current or the alternating voltage outputted by the ballast is out of the preset value range, it is indicated that the direct current outputted by the rectifier 111 can not meet the working requirements of the LED device 120. Therefore, the current regulator 113 needs to process or transfer the direct current before outputting the direct current to the LED device 120. Therefore, the preset condition is set as: the alternating current or the alternating voltage outputted by the ballast is out of the preset value range. When the preset condition is met, the current regulator 113 converts or adjusts the direct current.

In some embodiments, by analyzing the alternating current or the alternating voltage outputted by the ballast 910, the output frequency of the ballast can be obtained, which can be used to determine whether the direct current outputted by the rectifier should be processed. Specifically, when the frequency of the alternating current or the alternating voltage outputted by the ballast 910 is lower than a preset frequency threshold, the current regulator 113 is configured to convert the direct current from the rectifier 111 into the driving current, the value of which is less than or equal to the preset current threshold. Therefore, in this case, the preset condition is that the frequency of the alternating current or voltage outputted by the ballast 910 is lower than the preset frequency threshold. In some embodiments, the preset frequency threshold is in the range of about 10 Hz to about 99 Hz.

When the frequency of the alternating current or voltage outputted by the ballast 910 is higher than the preset frequency threshold, the current regulator 130 is configured to output the direct current from the rectifier 111 to the LED device as the driving current.

Continuing referring to FIG. 1, the LED device comprises a plurality of LED chips 121 coupled in series. In this case, the maximum current the LED device able to carry without damage is substantially equal to a rated current of the LED chip.

In some embodiments, the current regulator 113 comprises a comparison judgment unit (not shown) for comparing the signal detected by the detecting module 115 with the preset range or threshold value, and then determining whether to process and convert the direct current from the rectifier 111.

Alternatively, in some other embodiments, the comparison judgment unit can be integrated into the detecting module. Specifically, the detecting module may comprise a sampling circuit and a judging circuit. The sampling circuit is configured to sample the signal. The judging circuit is configured to judge whether the signal sampled meets the preset condition, and output a judging result signal to the current regulator.

In some embodiments, the current regulator 113 comprises a current scaling module configured to scale down the direct current outputted by the rectifier to a value equal to or less than the preset current threshold if the signal meets the preset condition. The current scaling module may comprise a switching circuit, and a scaling ratio of the direct current can be set by setting a duty cycle of the switch.

In some embodiments, the current regulator 113 comprises a constant-current control module (not shown), which is configured to regulate the driving current to be substantially constant at the value equal to or less than the preset current threshold when the signal meets the preset condition. Specifically, the constant current control module comprises a feedback unit and a regulating unit. The feedback unit is configured to detect the driving current outputted by the current regulator 113 to the LED device and feed a real-time value of the driving current back to the regulating unit. The regulating unit is configured to adjust the driving current based on a difference between the real-time value of the driving current and an expected value of the driving current, so as to stabilize the value of the driving current around the expected value, wherein the expected value of the driving current can be set in advance and set to be less than or equal to the preset current threshold.

Figure 2:
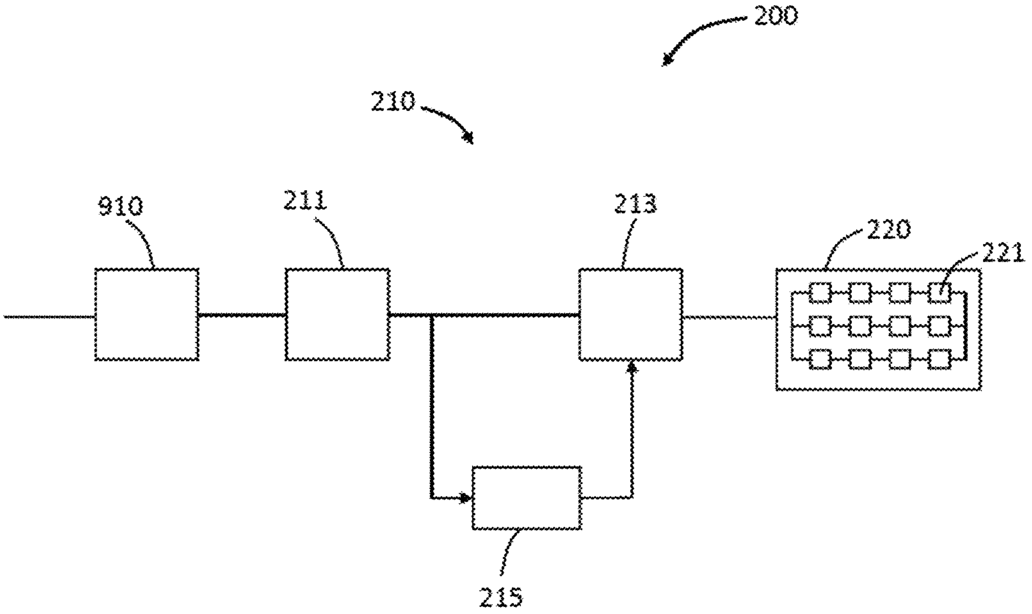
FIG. 2 is a sketch view of an LED system in accordance with another exemplary embodiment of the present disclosure.

FIG. 2 is a sketch view of an LED system 200 in accordance with another exemplary embodiment of the present disclosure. Referring to FIG. 2, the LED system 200 comprises an LED device 220 and a driver 210 for the LED device. The driver 210 comprises a rectifier 211, a current regulator 213 and a detecting module 215. The rectifier 211 is configured to be coupled to the ballast 910, and the current regulator 213 is coupled between the rectifier 211 and the LED device 220. The detecting module 215 is coupled between an output terminal of the rectifier 211 and the current regulator 213, and configured to detect a direct current or voltage outputted by the rectifier 211 during a startup stage of the LED device and provide the detected signal to the current regulator 213.

The above detecting indicator, i.e.: the direct current or voltage outputted by the rectifier 211 has a corresponding preset value range. When the direct current or voltage outputted by the rectifier 211 is within the corresponding preset value range, the current regulator 213 is configured to output the direct current from the rectifier 211 to the LED device as the driving current.

When the direct current or voltage outputted by the rectifier 211 exceeds the corresponding preset range, the current regulator 213 converts the direct current from the rectifier 211 into a driving current, the value of which is less than or equal to a preset current threshold. Therefore, the preset condition is that the direct current or voltage outputted by the rectifier 211 is out of the corresponding preset value range.

In some embodiments, the LED device comprises N groups of LED chips, which are coupled in parallel with each other. Each group of LED chips comprises a plurality of LED chips coupled in series. The maximum current the LED device able to carry without damage is substantially equal to N times a rated current of each LED chip, wherein N is a natural number equal to or larger than 2.

In some embodiments, as shown in FIG. 2, the LED device 220 comprises three groups of LED chips coupled in parallel with each other. Each group of LED chips comprises a plurality of LED chips coupled in series with each other. The maximum current the LED device 220 able to carry is substantially three times the rated current of each LED chip.

The other functions and structures of the rectifier 211, the current regulator 213 and the detecting module 215 are respectively similar to those of the rectifier 111, the current regulator 113 and the detection module 115 in the embodiment shown in FIG. 1, which will not be repeated here.

Figure 3:
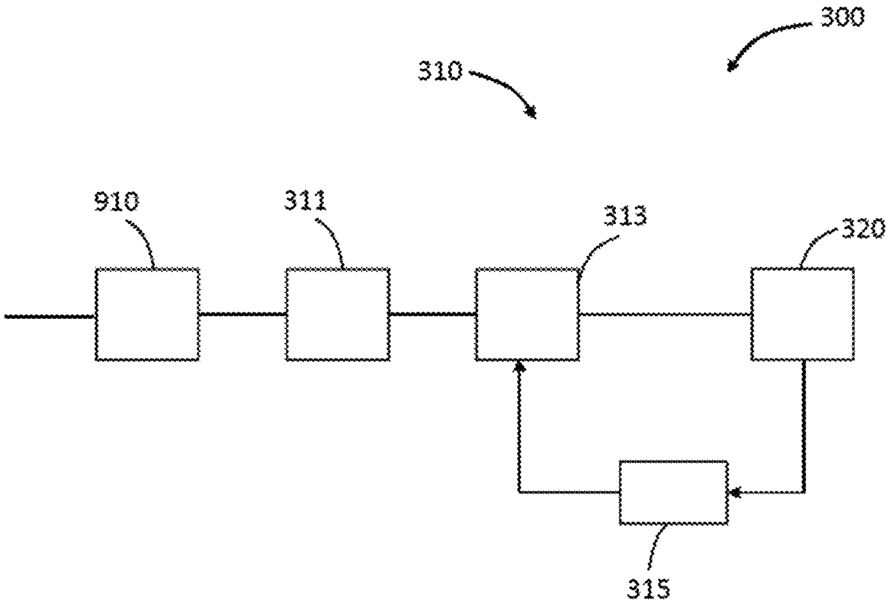
FIG. 3 is a sketch view of an LED system in accordance with another exemplary embodiment of the present disclosure.

FIG. 3 is a sketch view of an LED system 300 in accordance with another exemplary embodiment of the present disclosure. Referring to FIG. 3, the LED system 300 comprises an LED device 320 and a driver 310 for the LED device. The driver 310 comprises a rectifier 311, a current regulator 313 and a detecting module 315. The rectifier 311 is configured to be coupled to the ballast 910, and the current regulator 213 is coupled between the rectifier 311 and the LED device 320.

The detecting module 315 is coupled between the LED device 320 and the current regulator 313, and configured to detect a current through the LED device 320 during a startup stage of the LED device and provide the detected signal to the current regulator 313.

The above detecting indicator, i.e.: the current through the LED device, has a corresponding preset value range. When the current through the LED device is within the corresponding preset value range, the current regulator 313 is configured to output the direct current from the rectifier 311 to the LED device 320 as the driving current.

When the current through the LED device is out of the corresponding preset range, the current regulator 313 converts the direct current from the rectifier 311 into a driving current, the value of which is less than or equal to a preset current threshold. The preset current threshold is less than a maximum current the LED device able to carry without damage. Therefore, the preset condition is that the current through the LED device 320 is out of the corresponding preset value range.

The other functions and structures of the rectifier 311, the current regulator 313 and the detecting module 315 are respectively similar to those of the rectifier 111, the current regulator 113 and the detection module 115 in the embodiment shown in FIG. 1, which will not be repeated here.

Figure 4:
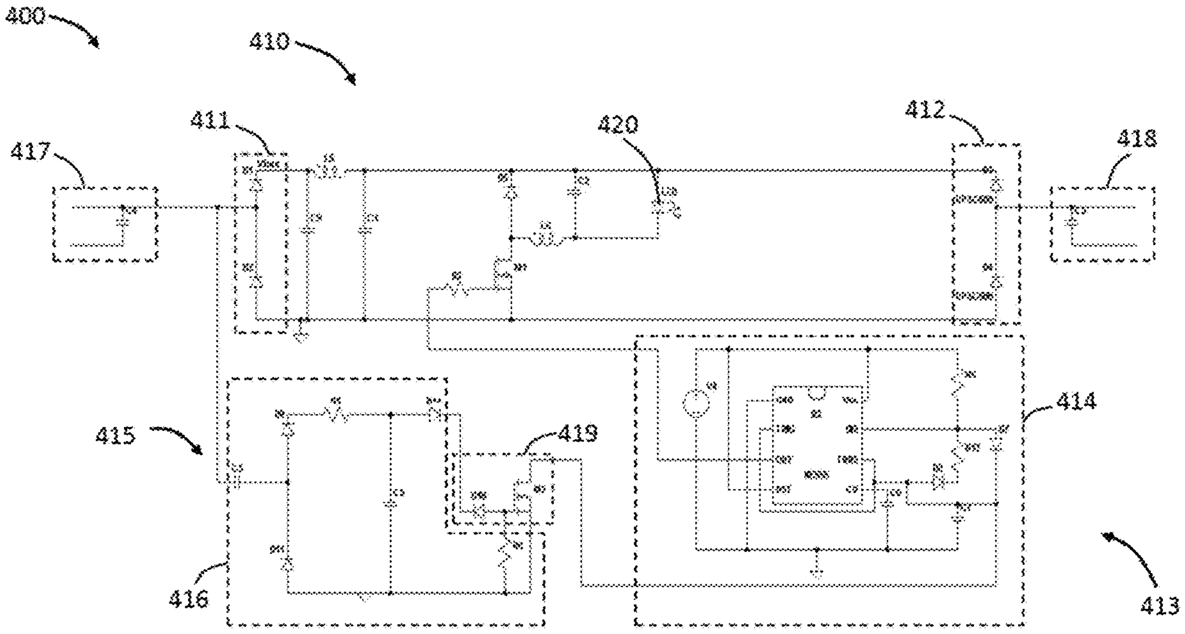
FIG. 4 is a sketch view of an LED system in accordance with another exemplary embodiment of the present disclosure.

FIG. 4 is a sketch view of an LED system 400 in accordance with another exemplary embodiment of the present disclosure. Referring to FIG. 4, the LED system 400 comprises an LED device 420 and a driver 410 for the LED device. The driver 410 comprises an input module, a rectifier, a current regulator 413 and a detecting module 415, wherein the input module comprises a first input unit 417 and a second input unit 418, and the rectifier comprises a first rectifier unit 411 and a second rectifier unit 412.

The first and second input units 417, 418 are configured to be coupled with the ballast (not shown) and receive an alternating current from the ballast. The first input unit 417 comprises two input terminals, and the two input terminals are coupled with each other via a capacitor C4. Similarly, the second input unit 418 comprises two input terminals, and the two input terminals are coupled with each other via a capacitor C8.

The first and second rectifier units 411, 412 are configured to convert the alternating current from the ballast into a direct current. The first rectifier unit 411 comprises a diode D1 and a diode D2 coupled in series. An output terminal of the first input unit 417 is coupled to a node between the diode D1 and the diode D2. Similarly, the second rectifier unit 412 comprises a diode D3 and a diode D4 coupled in series. An output of the second input unit 418 is coupled to a node between the diode D3 and the diode D4.

In some embodiments, the alternating current of the ballast is inputted to the rectifier via the first and second input units 417 and 418. The first and second rectifier units 411 and 412 operate simultaneously to convert the alternating current into the direct current.

The detecting module 415 is coupled between the output terminal of the first input unit 417 and the current regulator 413. The detecting module 415 is configured to detect the alternating current or an alternating voltage outputted by the ballast, determine whether a frequency of the alternating current or voltage outputted by the ballast is lower than a preset frequency threshold, and send a judgment result signal to the current regulator 413.

Specifically, the detecting module 415 comprises a sampling circuit 416 and a judging circuit 419 The sampling circuit 416 comprises two capacitors C3, C5, three diodes D9, D11, D14 and two resistors R3, R6. The judging circuit 419 comprises a switch tube M2 and a Zener diode D10. The diodes D11, D9, the resistor R3 and the diode D14 are connected in series. A first end of the capacitor C3 is coupled to the output terminal of the first input unit 417, and a second end of the capacitor C3 is coupled to a node between D9 and D11. A first end of the capacitor C5 is coupled to a node between R3 and D14, and a second end of the capacitor C5 is coupled to an anode of D11. A cathode of D14 is coupled to a cathode of D10. An anode of D10 is coupled to a gate of the switch tube M2, a drain of M2 is coupled to the current regulator 413, and a source of M2 is coupled to the second end of C5. A first end of R6 is coupled to the gate of M2, and a second end of R6 is coupled to the second end of C5.

When the frequency of the alternating current or voltage outputted by the ballast is lower than the preset frequency threshold, the switch tube M2 is turned off and an enable signal is outputted to the current regulator 413. When the frequency of the alternating current or voltage outputted by the ballast is higher than the preset frequency threshold, the switch tube M2 is turned on and a disable signal is outputted to the current regulator 413.

The current regulator 413 comprises a first switch M1 and a switch controller 414 coupled to a control end of the first switch M1. Specifically, an output end of the switch controller 414 is coupled to the control end of the first switch M1. An input end of the switch controller 414 is coupled to the output end of the detecting module 415, that is, the drain of M2. The switch controller 414 is configured to send a control signal to the first switch M1 according to a judgment result signal from the detecting module 415 (i.e. the enable signal or the disable signal), in order to control the first switch M1 to be on or off, or a duty cycle of the first switch M1, thereby controlling a value of the driving current provided to the LED device 420.

When the switch controller 414 receives the enable signal from the detecting module 415, it outputs a pulse signal with a certain duty cycle to the first switch M1 as the control signal of the first switch M1. The value of the driving current provided to the LED device 420 by the current regulator 413 can be adjusted to a value equal to or less than the preset current threshold by adjusting the duty cycle.

When the switch controller 414 receives the disable signal from the detecting module 415, it outputs a constant high-level signal to the first switch M1 to short-circuit the first switch M1. Thus, the current regulator outputs the direct current from the rectifier 411, 412 to the LED device 420 as the driving current.

Figure 5:
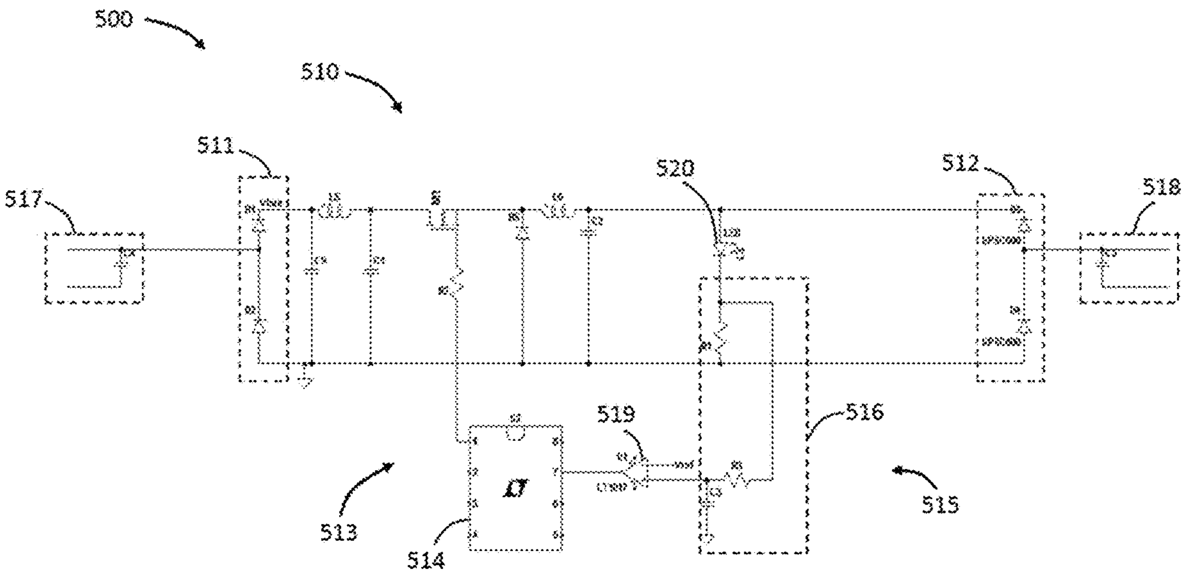
FIG. 5 is a sketch view of an LED system in accordance with another exemplary embodiment of the present disclosure.

FIG. 5 is a sketch view of an LED system 500 in accordance with another exemplary embodiment of the present disclosure. Referring to FIG. 5, the LED system 500 comprises an LED device 520 and a driver 510 for the LED device 520. The driver 510 comprises an input module, a rectifier, a current regulator 513 and a detecting module 515, wherein the input module comprises a first input unit 517 and a second input unit 518, and the rectifier comprises a first rectifier unit 511 and a second rectifier unit 512.

Structures and functions of the first and second input units 517, 518 and the first and second rectifier units 511, 512 are respectively similar to those of the first and second input unit 417, 418 and the first and second rectifier unit 411, 412 in the embodiment shown in FIG. 4.

The detecting module 515 is coupled between the LED device 520 and the current regulator 513 and configured to detect the current through the LED device 520, determine whether a value of the current is out of the preset value range, and output a judgment result signal to the current regulator 513. When the value of the current through the LED device is within the preset value range, the detecting module 515 outputs a disable signal to the current regulator 514. When the value of the current through the LED device is out of the preset value range, the detecting module 515 outputs an enable signal to the current regulator 514.

Specifically, the detecting module 515 comprises a sampling circuit 516 and a judging circuit 519. The sampling circuit 516 comprises resistors R1, R3 and a capacitor C3. The judging circuit 519 comprises a comparator. R1 is coupled with the LED device 520 in series, and it is coupled between a cathode of the LED device and an earthing point. A first end of R3 is coupled to a node between R1 and the LED device 520, and a second end of R3 is coupled to an input end of the comparator 519. A first end of C3 is coupled to the input end of comparator 519, and a second end of C3 is grounded. An output end of the comparator 519 is coupled to the current regulator 513.

The current regulator 513 comprises a first switch M1 and a switch controller 514 coupled to a control end of the first switch M1. Specifically, an output end of the switch controller 514 is coupled to the control end of the first switch M1. An input end of the switch controller 514 is coupled to an output end of the detecting module 515, that is, the output end of the comparator 519. The switch controller 514 is configured to send a control signal to the first switch M1 according to the judgment result signal (i.e. the enable signal or the disable signal) from the detecting module 515, to control the first switch M1 to be on or off or a duty cycle of the first switch M1, thereby controlling a value of the driving current provided to the LED device 520.

When the switch controller 514 receives the enable signal from the detecting module 515, it outputs a pulse signal with a certain duty cycle to the first switch M1 as the control signal of the first switch M1. The value of the driving current provided to the LED device 520 by the current regulator 513 can be adjusted to a value equal to or less than the preset current threshold by adjusting the duty cycle.

When the switch controller 514 receives the disable signal from the detecting module 515, it outputs a constant high-level signal to the first switch M1 to short-circuit the first switch M1. Thus, the current regulator outputs the direct current from the rectifier 511, 512 to the LED device 520 as the driving current.

Embodiments of the present disclosure also relate to a method for adapting an LED device to a ballast, which can enable the LED device be adapted to various types of ballasts.

Figure 6:
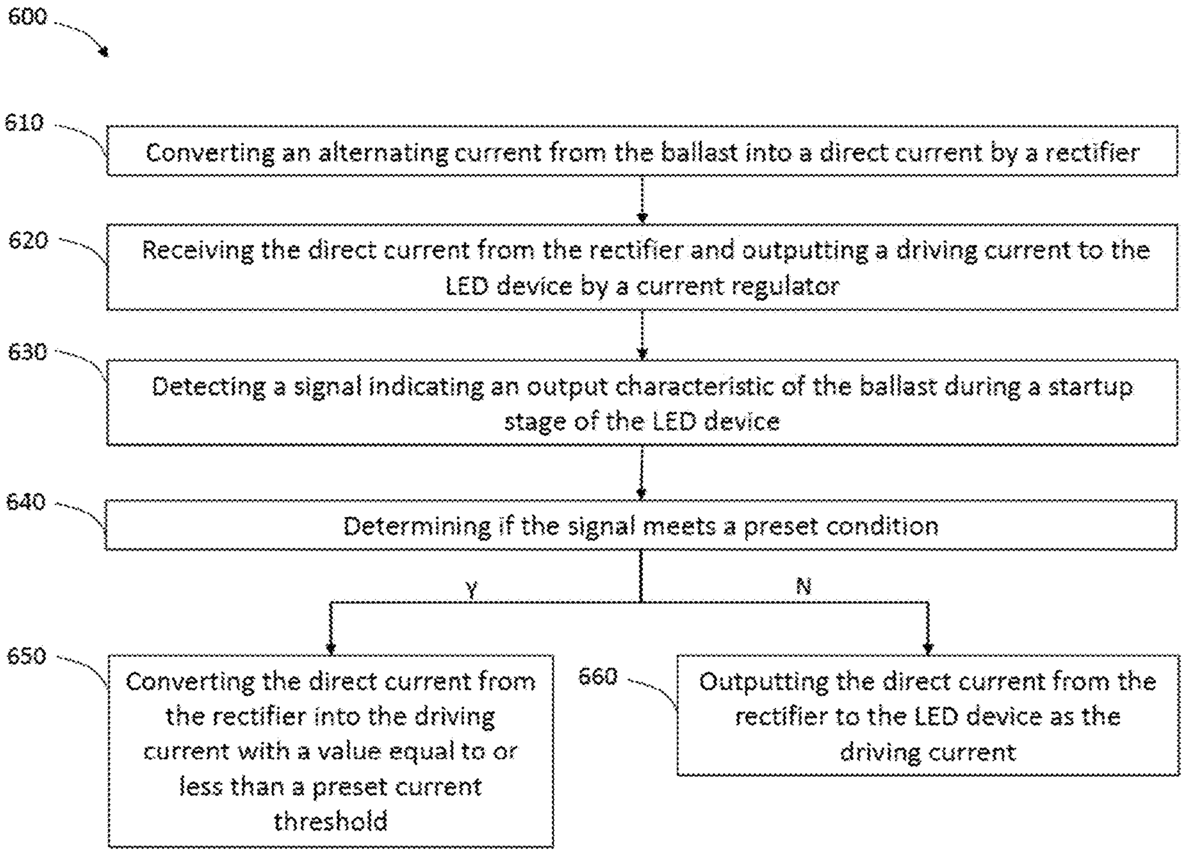
FIG. 6 is a flowchart showing a method for adapting an LED device to a ballast.

FIG. 6 is a flowchart showing a method 600 for adapting an LED device to a ballast.

Step 610 relates to converting an alternating current from the ballast into a direct current by a rectifier.

Step 620 relates to receiving the direct current from the rectifier and outputting a driving current to the LED device by a current regulator;

Step 630 relates to detecting a signal indicating an output characteristic of the ballast during a startup stage of the LED device; wherein the signal comprises the alternating current outputted by the ballast, an alternating voltage outputted by the ballast, the direct current outputted by the rectifier, a direct voltage outputted by the rectifier, a current through the LED device or a combination thereof.

Step 640 relates to determining if the signal meets a preset condition. In some embodiments, the preset condition is that a frequency of the alternating current or the alternating voltage outputted by the ballast is lower than a preset frequency threshold. In some other embodiments, the preset condition is that: a value of the alternating current outputted by the ballast, the alternating voltage outputted by the ballast, the direct current outputted by the rectifier, the direct voltage outputted by the rectifier or the current through the LED device is out of the corresponding preset value range.

If the signal does not meet the preset condition, step 660 is executed, i.e.: outputting the direct current from the rectifier to the LED device as the driving current If the signal meets the preset condition, step 650 is executed, i.e.: converting the direct current from the rectifier into the driving current with a value equal to or less than a preset current threshold, wherein the preset current threshold is less than a maximum current the LED device is able to carry without damage.

In some embodiments, the step of converting the direct current, i.e. step 650, comprises scaling down the direct current to the value equal to or less than the preset current threshold. In other embodiments, step 650 comprises: regulating the driving current to be substantially constant at the value equal to or less than the preset current threshold.

As will be understood by those familiar with the art, the present disclosure may be embodied in other specific forms without depending from the spirit or essential characteristics thereof. Accordingly, the disclosures and descriptions herein are intended to be illustrative, but not limiting, of the scope of the disclosure which is set forth in the following claims.

What is claimed is:

1. A method for operating a driver circuit for a light-emitting diode (LED) device, wherein the driver circuit comprises a rectifier operatively coupled to a ballast, a current regulator operatively coupled to the rectifier and to the LED device, and a detecting module operatively coupled to the LED device and to the current regulator, comprising:

rectifying, by the rectifier of the driver circuit during a startup stage, direct current received from the ballast and providing the rectified current to the current regulator;

detecting, by the detecting module of the driver circuit, a current through the LED device provided by the current regulator during the startup stage, wherein a value of the current through the LED device is a detecting indictor having a preset value range;

providing, by the detecting module, the value of the current through the LED device to the current regulator;

determining, by the current regulator, that the value of the current is outside the preset value range;

converting, by the current regulator, the rectified current from the rectifier into a driving current with a value within the preset value range; and outputting, by the current regulator, the driving current to the LED device.

2. The method of claim 1, wherein the LED device comprises an LED chip comprising a plurality of LEDs coupled in series, and the driving current is substantially equal to a rated current of the LED chip.

3. The method of claim 1, wherein the LED device comprises N groups of LED chips, the N groups of LED chips are coupled in parallel with each other, each group comprises a plurality of LEDs coupled in series, and the driving current is substantially equal to N times a rated current of the LED chip, wherein N is a natural number equal to or larger than 2.

4. The method of claim 1, further comprising directly transmitting, by the current regulator, rectified current from the rectifier to the LED device when the detected value of the current through the LED device is within the preset value range.

5. The method of claim 1, wherein the current regulator comprises a current scaling module configured for scaling down direct current to a value equal to or less than a preset current threshold when the detected value of the current through the LED is not within the preset value range.

6. The method of claim 1, wherein the current regulator comprises a constant-current control module configured for regulating the driving current to be substantially constant at the value equal to or less than a preset current threshold.

7. The method of claim 1, wherein the detecting module comprises a sampling circuit for sampling the current through the LED device and a judging circuit for judging whether the current through the LED device is within the preset value range.

8. A driver for a light-emitting diode (LED) device comprising:

a rectifier operatively coupled to a ballast;

a current regulator operatively connected to the rectifier and to the LED device; and a detecting module operatively coupled to the current regulator and to the LED device;

wherein the rectifier rectifies direct current received from the ballast and provides the rectified current to the current regulator during a startup stage, the detecting module detects a current through the LED device provided by the current regulator during the startup stage, wherein a value of the current through the LED device is a detecting indictor having a preset value range, and provides the value of the current through the LED device to the current regulator, and wherein, when the current regulator determines that the value of the current is outside the preset value range, the current regulator converts the rectified current from the rectifier into a driving current with a value within the preset value range, and outputs the driving current to the LED device.

9. The driver according to claim 8, wherein the LED device comprises an LED chip comprising a plurality of LEDs coupled in series, and the driving current is substantially equal to a rated current of the LED chip.

10. The driver according to claim 8, wherein the LED device comprises N groups of LED chips, the N groups of LED chips are coupled in parallel with each other, each group comprising a plurality of LEDs coupled in series, and the maximum current is substantially equal to N times a rated current of the LED chip, wherein N is a natural number equal to or larger than 2.

11. The driver according to claim 8, wherein the current regulator directly transmits rectified current from the rectifier to the LED device when the detected value of the current through the LED device is within the preset value range.

12. The driver according to claim 8, wherein the current regulator comprises a current scaling module configured for scaling down direct current to a value equal to or less than a preset current threshold when the detected value of the current through the LED is not within the preset value range.

13. The driver according to claim 8, wherein the current regulator comprises a constant-current control module for regulating the drive current to be substantially constant at the value equal to or less than ae preset current threshold.

14. The driver according to claim 8, wherein the detecting module comprises:

a sampling circuit for sampling the current through the LED device; and a judging circuit for judging whether the current through the LED device is within the preset value range.

* * * * *